(12) United States Patent
Genner

(10) Patent No.: US 11,681,787 B1
(45) Date of Patent: Jun. 20, 2023

(54) OWNERSHIP VALIDATION FOR CRYPTOGRAPHIC ASSET CONTRACTS USING IRREVERSIBLY TRANSFORMED IDENTITY TOKENS

(71) Applicant: T Stamp Inc., Atlanta, GA (US)

(72) Inventor: Gareth Neville Genner, Atlanta, GA (US)

(73) Assignee: T STAMP INC., Atlanta, GA (US)

( * ) Notice: Subject to any disclaimer, the term of this patent is extended or adjusted under 35 U.S.C. 154(b) by 0 days.

(21) Appl. No.: 17/966,355

(22) Filed: Oct. 14, 2022

Related U.S. Application Data

(60) Provisional application No. 63/256,347, filed on Oct. 15, 2021.

(51) Int. Cl.
*G06F 21/31* (2013.01)
*G06F 21/60* (2013.01)

(52) U.S. Cl.
CPC ............ *G06F 21/31* (2013.01); *G06F 21/602* (2013.01)

(58) Field of Classification Search
CPC ................................ G06F 21/31; G06F 21/602
See application file for complete search history.

(56) References Cited

U.S. PATENT DOCUMENTS

| | | | | |
|---|---|---|---|---|
| 8,104,074 B2* | 1/2012 | Cameron | ................ | G06F 21/33 713/170 |
| 8,280,120 B2* | 10/2012 | Hoyos | .................... | G06V 40/16 340/5.83 |
| 8,508,338 B1* | 8/2013 | Fiddy | ............... | G06Q 20/40145 340/5.82 |
| 10,360,464 B1* | 7/2019 | McKay | ................ | G06V 40/172 |
| 10,587,406 B1* | 3/2020 | Levin | .................... | H04L 9/0869 |
| 10,740,474 B1* | 8/2020 | Ghetti | ..................... | H04L 9/321 |
| 11,004,282 B1* | 5/2021 | Bajaj | .................. | G07C 9/00563 |
| 11,080,387 B1* | 8/2021 | Lattin | ..................... | G06F 21/44 |
| 11,081,219 B1* | 8/2021 | Dods | ....................... | G16H 20/10 |
| 11,212,264 B1* | 12/2021 | Griffin | ...................... | H04L 9/14 |
| 11,216,553 B1* | 1/2022 | Cancilla | .................. | G06F 21/45 |
| 11,375,371 B1* | 6/2022 | Carroll | ............... | H04W 12/033 |
| 11,394,721 B2* | 7/2022 | Chen | ....................... | H04L 63/12 |
| 2002/0194140 A1* | 12/2002 | Makuck | ............. | G06Q 20/1235 705/67 |
| 2003/0084170 A1* | 5/2003 | de Jong | ............. | H04L 63/0407 709/227 |
| 2003/0084171 A1* | 5/2003 | de Jong | ................. | H04L 67/34 709/229 |

(Continued)

*Primary Examiner* — Aravind K Moorthy
(74) *Attorney, Agent, or Firm* — Morris, Manning & Martin, LLP; Daniel E. Sineway, Esq.

(57) ABSTRACT

A method can include receiving identity data from a computing device. The method can include verifying that the identity data is associated with a live subject. The method can include generating a privacy-secured token based on the identity data. The method can include generating a randomized unique user identifier (RUUI). The method can include storing the privacy-secured token and the RUUI in association at a first registry. The method can include transmitting the RUUI to the computing device. The method can include configuring metadata of a cryptographic asset to include the RUUI. The cryptographic asset may be associated with a second registry, and the second registry may be associated with a blockchain environment.

20 Claims, 5 Drawing Sheets

(56) References Cited

U.S. PATENT DOCUMENTS

| | | | |
|---|---|---|---|
| 2003/0084288 A1* | 5/2003 | de Jong | H04L 63/0407 713/168 |
| 2005/0123133 A1* | 6/2005 | Stewart | H04L 63/0428 380/46 |
| 2007/0250718 A1* | 10/2007 | Lee | H04L 63/0861 713/186 |
| 2008/0009345 A1* | 1/2008 | Bailey | G07F 17/3251 463/29 |
| 2010/0014720 A1* | 1/2010 | Hoyos | G06V 40/45 382/118 |
| 2010/0205448 A1* | 8/2010 | Tarhan | H04L 63/0807 713/185 |
| 2011/0246433 A1* | 10/2011 | Sun | G06F 16/10 707/698 |
| 2012/0054846 A1* | 3/2012 | Lightsey | H04L 67/14 726/9 |
| 2012/0198084 A1* | 8/2012 | Keskitalo | H04L 67/02 709/228 |
| 2012/0253810 A1* | 10/2012 | Sutton | G06F 21/32 704/E15.001 |
| 2012/0268241 A1* | 10/2012 | Hanna | G06F 21/32 340/5.52 |
| 2014/0033317 A1* | 1/2014 | Barber | G06Q 30/0609 709/224 |
| 2014/0282922 A1* | 9/2014 | Iwanski | H04L 63/062 726/5 |
| 2014/0337930 A1* | 11/2014 | Hoyos | H04L 63/10 726/4 |
| 2015/0120387 A1* | 4/2015 | Marilla | G06Q 30/0202 705/7.31 |
| 2015/0161417 A1* | 6/2015 | Kaplan | G06K 7/1417 235/380 |
| 2015/0242332 A1* | 8/2015 | Kamath | G06F 12/1408 713/193 |
| 2015/0281225 A1* | 10/2015 | Schoen | H04L 63/08 726/9 |
| 2015/0288665 A1* | 10/2015 | El Emam | H04L 9/008 713/171 |
| 2015/0288694 A1* | 10/2015 | Liebl, III | H04L 9/3247 713/182 |
| 2016/0092665 A1* | 3/2016 | Cowan | H04W 12/06 726/9 |
| 2016/0100314 A1* | 4/2016 | Chung | H04L 63/0861 713/186 |
| 2016/0148255 A1* | 5/2016 | Shariat | G06Q 30/0275 705/14.53 |
| 2016/0180150 A1* | 6/2016 | Negi | G06V 40/45 382/118 |
| 2016/0188958 A1* | 6/2016 | Martin | G06V 40/161 382/118 |
| 2016/0196475 A1* | 7/2016 | Martin | G06V 40/16 382/117 |
| 2016/0234175 A1* | 8/2016 | Zhao | H04L 63/0428 |
| 2016/0239657 A1* | 8/2016 | Loughlin-McHugh | G06F 21/45 |
| 2016/0308862 A1* | 10/2016 | Rolfe | H04L 9/3231 |
| 2016/0359822 A1* | 12/2016 | Rivera | H04L 63/0435 |
| 2017/0019400 A1* | 1/2017 | Drolshagen | H04L 63/0861 |
| 2017/0085568 A1* | 3/2017 | Rolfe | H04L 63/06 |
| 2017/0118209 A1* | 4/2017 | Saravanan | G06F 18/22 |
| 2017/0126642 A1* | 5/2017 | Basin | H04L 9/3226 |
| 2017/0180348 A1* | 6/2017 | Piccolotto | G06F 21/32 |
| 2018/0174150 A1* | 6/2018 | Das | G06Q 20/4016 |
| 2018/0349736 A1* | 12/2018 | Bapat | G06V 40/10 |
| 2019/0347440 A1* | 11/2019 | Langley | H04L 63/1441 |
| 2020/0117780 A1* | 4/2020 | Kaladgi | G06V 40/45 |
| 2020/0201967 A1* | 6/2020 | Maxwell | H04L 63/0861 |
| 2020/0226416 A1* | 7/2020 | Bapat | H04N 7/18 |
| 2020/0322668 A1* | 10/2020 | Hawthorne | G06F 21/62 |
| 2020/0334347 A1* | 10/2020 | Hoyos | H04L 63/0861 |
| 2021/0089635 A1* | 3/2021 | Weeresinghe | G06Q 20/40145 |
| 2021/0133736 A1* | 5/2021 | Kavanagh | G06Q 20/3825 |
| 2021/0144009 A1* | 5/2021 | Dinkelmann | G06V 10/25 |
| 2021/0176236 A1* | 6/2021 | Dimitrov | G06F 21/33 |
| 2021/0176242 A1* | 6/2021 | McDougall | G06F 21/32 |
| 2021/0218547 A1* | 7/2021 | Weiler | G06F 9/5016 |
| 2021/0224925 A1* | 7/2021 | Takahashi | G06Q 50/01 |
| 2021/0334769 A1* | 10/2021 | Kress | G06Q 20/383 |
| 2021/0342850 A1* | 11/2021 | Kumar | G06Q 20/3821 |
| 2021/0409214 A1* | 12/2021 | Nix | H04L 9/3242 |
| 2022/0070172 A1* | 3/2022 | Muthusamy | H04L 63/108 |
| 2022/0189231 A1* | 6/2022 | Ahern | G07C 9/257 |
| 2022/0206958 A1* | 6/2022 | LeMay | G06F 12/1466 |
| 2022/0247554 A1* | 8/2022 | Peddada | H04L 9/0841 |
| 2022/0309548 A1* | 9/2022 | Yoon | G06Q 30/0282 |
| 2022/0335412 A1* | 10/2022 | Rule | G06Q 30/01 |
| 2023/0011468 A1* | 1/2023 | Giri | G06F 12/0806 |
| 2023/0012373 A1* | 1/2023 | Moon | H04L 63/0815 |

* cited by examiner

US 11,681,787 B1

OWNERSHIP VALIDATION FOR CRYPTOGRAPHIC ASSET CONTRACTS USING IRREVERSIBLY TRANSFORMED IDENTITY TOKENS

CROSS-REFERENCE TO RELATED APPLICATIONS

This application claims the benefit of and priority to U.S. Application 63/256,347, filed Oct. 15, 2021, entitled "OWNERSHIP VALIDATION FOR NFT CONTRACTS USING IRREVERSIBLY TRANSFORMED IDENTITY TOKENS," the disclosure of which is incorporated herein by reference in its entirety.

The disclosures of U.S. Non-Provisional patent application Ser. No. 17/401,504, filed on Aug. 13, 2021, and entitled "SYSTEMS AND METHODS FOR LIVENESS-VERIFIED, BIOMETRIC-BASED ENCRYPTION," U.S. Non-Provisional patent application Ser. No. 15/955,270, filed on Apr. 17, 2018, and entitled "SYSTEMS AND METHOD FOR IDENTITY VERIFICATION VIA THIRD PARTY ACCOUNTS," U.S. Non-Provisional patent application Ser. No. 16/841,269, filed on Apr. 6, 2020, and entitled "SYSTEMS AND PROCESSES FOR LOSSY BIOMETRIC REPRESENTATIONS," U.S. Non-Provisional patent application Ser. No. 17/230,684, filed on Apr. 14, 2021, and entitled "SYSTEMS AND PROCESSES FOR MULTI-MODAL BIOMETRICS," and U.S. Provisional Patent Application No. 63/188,491, filed on May 14, 2021, and entitled "SECURE REPRESENTATIONS OF AUTHENTICITY AND PROCESSES FOR USING THE SAME" are incorporated by reference in their entireties as if the same were fully set forth herein.

TECHNICAL FIELD

The present systems and processes relate generally to cryptographic asset ownership and validation thereof.

BACKGROUND

Cryptographic assets are typically associated with a particular digital address (e.g., a "digital wallet" address) as a means of conveying ownership. For example, to convey ownership of a non-fungible token (NFT), an association of the NFT with a particular digital wallet address may be recorded on a decentralized ledger (e.g., a "blockchain"). Use of cryptographic assets, or privileges associated therewith, is often authenticated based on verifying that the asset-to-be used is associated with the use-requesting digital wallet. However, digital wallets are vulnerable to fraud, pilferage, and user errors; therefore, the use of a digital wallet address as the sole verifying means for proof of asset ownership may render cryptographic assets vulnerable to theft. For example, an attacker may obtain access to a user's mobile device and utilize a digital wallet application thereon to initiate illicit transfer of the user's cryptographic assets. Previous systems are agnostic as to the identity of the digital wallet user and, therefore, may allow an attacker to pilfer cryptographic assets unencumbered, unchallenged, and with little to no fear of later identification. Further, because previous systems fail to validate asset owner identity, such systems may be incapable of alerting users to as attempted or successful thefts of cryptographic assets.

Therefore, there is a long-felt but unresolved need for improved systems and processes for validating ownership of cryptographic assets.

BRIEF SUMMARY OF THE DISCLOSURE

Briefly described, and according to one embodiment, aspects of the present disclosure generally relate to systems and processes for validating cryptographic asset ownership.

In various embodiments, the present disclosure provides systems, processes, and techniques are described for ownership validation of cryptographic assets and/or contracts using irreversibly transformed identity tokens (referred to herein as "privacy-secured tokens" or "tokens").

In an exemplary scenario, an ownership validation process may include, but is not limited to, the validation system generating an irreversibly transformed identity token (e.g., "enrollment token") using one or more modalities of biometric data optionally supplemented by other personally identifiable information (e.g., "identity data"). The validation system can receive second identity data. Based on the second identity data, the validation system can generate a new irreversibly transformed identity token (e.g., "probe token") that can be probabilistically matched against the enrollment token. Thus, the validation system may generate the enrollment token such that the enrollment token functions as a subject's private key.

The validation system can store the enrollment token on a permissioned blockchain or other cryptographically verified distributed ledger or other form of structured database (e.g., a "private ledger") against a randomized unique user identifier (hereinafter the "RUUI"). The RUUI can thereafter serve as the subject's public key. The validation system, or a computing device associated with the subject, can command a blockchain environment to create a cryptographic asset in association with the RUUI (e.g., using a custom token format or a standardized token format, such as ERC-721 or ERC-1155). The cryptographic asset, or metadata thereof, can incorporate or include the RUUI. The blockchain environment can store the cryptographic on a publicly accessible blockchain or other cryptographically verified distributed ledger (e.g., a "public ledger").

The validation system can receive, from an inquirer system, the RUUI and a contract address of the cryptographic asset. The validation system can prompt the enrolled subject's computing device for approval of the inquiry. In response to receiving inquiry approval, the validation system can receive second identity data from the subject's computing device. The validation system can generate a new probe token based on the second identity data. The validation system can retrieve the enrollment token from the private ledger based on the RUUI. The validation system can compare the probe token to the enrollment token using a software matcher linked to the private ledger. Based on the comparison, the validation system can determine that probe token is associated with the same subject with which the enrollment token is associated. The validation system can confirm to the inquirer the ownership and control of the RUUI and, by association, the cryptographic asset.

To prevent against a replay, spoofing or other presentation attack intended to simulate the identity data required from the subject to generate a token matchable by the software matcher, the validation system can implement presentation attack detection tools to verify or predict the likelihood of the live presence of identity data.

According to a first aspect, a method, comprising: A) receiving identity data from a computing device; B) verifying that the identity data is associated with a live subject; C) generating a privacy-secured token based on the identity data; D) generating a randomized unique user identifier (RUUI); E) storing the privacy-secured token and the RUUI in association at a first registry; F) transmitting the RUUI to the computing device; and G) configuring metadata of a cryptographic asset to include the RUUI, wherein: 1) the cryptographic asset is associated with a second registry; and 2) the second registry is associated with a blockchain environment.

According to a further aspect, the method of the first aspect or any other aspect, wherein the RUUI is a first RUUI, the method further comprising: A) receiving an ownership validation request from a second computing device, wherein: 1) the ownership validation request comprises a second RUUI; and 2) the second computing device derived the second RUUI from the second registry; B) in response to the ownership validation request, prompting the computing device to provide second identity data; C) receiving the second identity data from the computing device; D) generating a second privacy-secured token based on the second identity data; E) retrieving the privacy-secured token from the first registry based on the second RUUI, the second RUUI being the same as the first RUUI; and F) positively validating ownership of the cryptographic asset based on a comparison of the second privacy-secured token to the privacy-secured token.

According to a further aspect, the method of the first aspect or any other aspect, wherein the identity data comprises a facial image.

According to a further aspect, the method of the first aspect or any other aspect, wherein the identity data further comprises personal identifiable information (PII) data.

According to a further aspect, the method of the first aspect or any other aspect, further comprising encoding the PII data into a fixed-size representation prior to generating the privacy-secured token.

According to a further aspect, the method of the first aspect or any other aspect, wherein: A) the identity data comprises first biometric data of a first type and second biometric data of a second type; and B) the method further comprises: 1) generating a first fixed-size representation (FXR) based on the first biometric data; 2) generating a second FXR based on the second biometric data; and 3) generating the privacy-secured token based on a blended FXR derived from the first FXR and the second FXR.

According to a further aspect, the method of the first aspect or any other aspect, wherein the first type is facial feature and the second type is fingerprint.

According to a further aspect, the method of the first aspect or any other aspect, further comprising generating the blended FXR by directly blending the first FXR and the second FXR.

According to a further aspect, the method of the first aspect or any other aspect, further comprising generating the blended FXR by sequentially blending the first FXR and the second FXR.

According to a second aspect, a system, comprising: A) a first registry; and B) at least one computing device in communication with the first registry, wherein the at least one computing device is configured to: 1) receive identity data from a second computing device; 2) verify that the identity data is associated with a live subject; 3) generate a privacy-secured token based on the identity data; 4) generate a randomized unique user identifier (RUUI); 5) store the privacy-secured token and the RUUI in association at the first registry; and 6) transmit the RUUI to the second computing device, wherein: i) the second computing device is configured to command a blockchain environment to configure metadata of a cryptographic asset to include the RUUI; and ii) the blockchain environment comprises a second registry configured to store the cryptographic asset and the metadata.

According to a further aspect, the system of the second aspect or any other aspect, wherein the RUUI is a first RUUI and the at least one computing device is further configured to: A) receive, from a third computing device, an ownership validation request comprising a second RUUI; B) in response to the ownership validation request, prompt the second computing device to provide second identity data; C) receive the second identity data from the second computing device; D) generate a second privacy-secured token based on the second identity data; E) retrieve the privacy-secured token from the first registry based on the second RUUI, the second RUUI being the same as the first RUUI; and F) positively validate ownership of the cryptographic asset based on a comparison of the second privacy-secured token to the privacy-secured token.

According to a further aspect, the system of the second aspect or any other aspect, wherein the at least one computing device is configured to transmit a confirmation of ownership validation to the third computing device.

According to a further aspect, the system of the second aspect or any other aspect, wherein the identity data comprises device data and biometric data.

According to a further aspect, the system of the second aspect or any other aspect, wherein the at least one computing device is configured to, prior to generating the privacy-secured token: A) encode the device data into a first FXR; and B) generate a second FXR based on the biometric data.

According to a further aspect, the system of the second aspect or any other aspect, wherein: A) the identity data comprises first biometric data of a first type and second biometric data of a second type; and B) the at least one computing device is further configured to: 1) generate a first FXR based on the first biometric data; 2) generate a second FXR based on the second biometric data; and 3) generate the privacy-secured token based on a blended FXR derived from the first FXR and the second FXR.

According to a further aspect, the system of the second aspect or any other aspect, wherein the first type is facial feature and the second type is fingerprint.

According to a further aspect, the system of the second aspect or any other aspect, wherein the at least one computing device is configured to generate the blended FXR by directly blending the first FXR and the second FXR.

According to a further aspect, the system of the second aspect or any other aspect, wherein the at least one computing device is configured to generate the blended FXR by sequentially blending the first FXR and the second FXR.

According to a third aspect, a non-transitory, computer-readable medium having instructions stored thereon that, when executed by a computer, cause the computer to: A) receive identity data from a second computing device; B) verify that the identity data is associated with a live subject; C) generate a privacy-secured token based on the identity data; D) generate a randomized unique user identifier (RUUI); E) store the privacy-secured token and the RUUI in association at a first registry; F) transmit the RUUI to the second computing device, wherein: 1) the second computing device is configured to command a blockchain environment to configure metadata of a cryptographic asset to include the RUUI; and 2) the blockchain environment comprises a second registry configured to store the cryptographic asset and the metadata.

According to a further aspect, the non-transitory, computer-readable medium of the third aspect or any other aspect, wherein the RUUI is a first RUUI and the instructions, when executed by the computer, further cause the computer to: A) receive, from a third computing device, an ownership validation request comprising a second RUUI; B) in response to the ownership validation request, prompt the second computing device to provide second identity data; C) receive the second identity data from the second computing device; D) generate a second privacy-secured token based on the second identity data; E) retrieve the privacy-secured token from the first registry based on the second RUUI, the second RUUI being the same as the first RUUI; and F) positively validate ownership of the cryptographic asset based on a comparison of the second privacy-secured token to the privacy-secured token.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
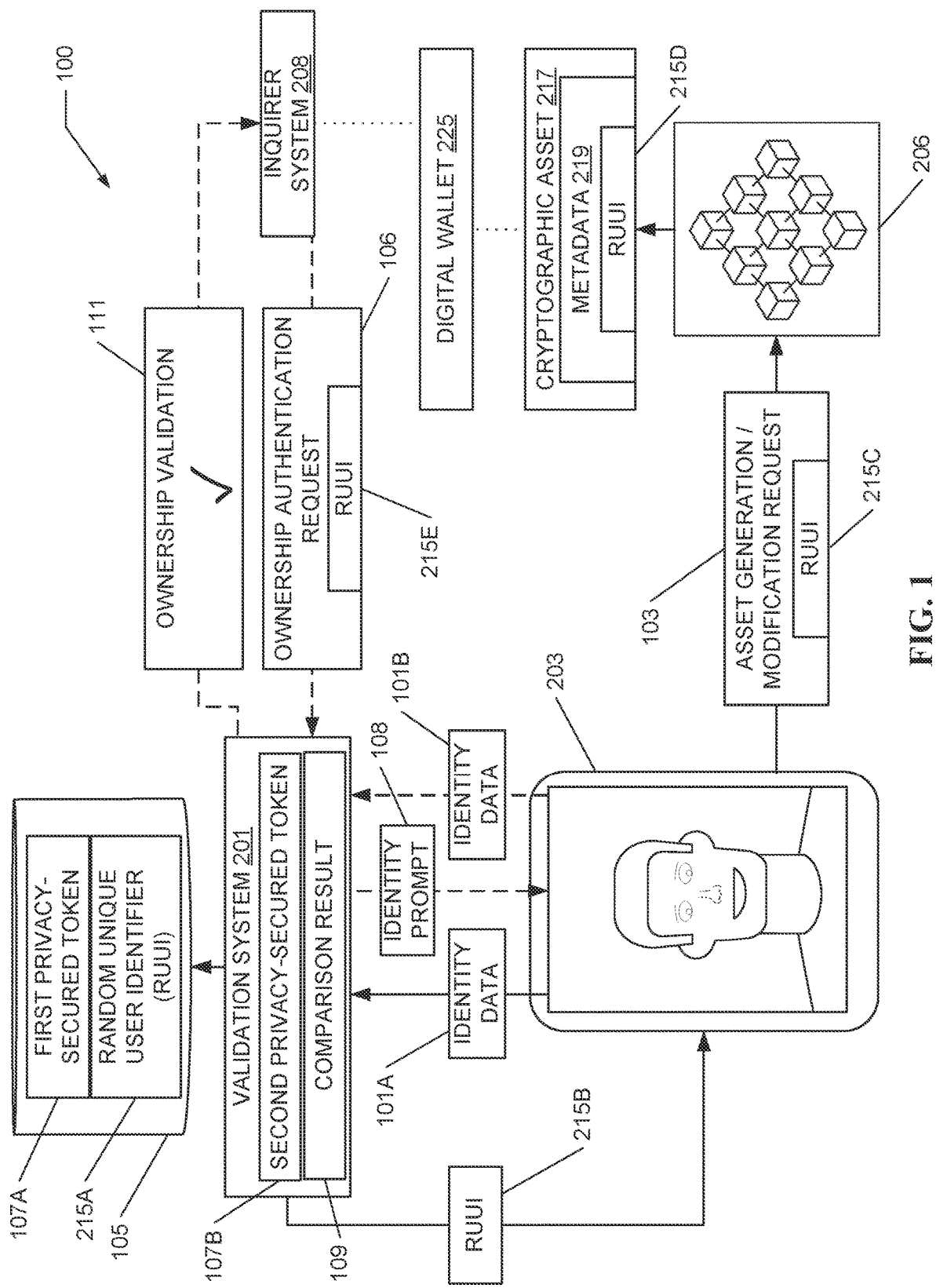
FIG. 1 shows an exemplary ownership enrollment and ownership validation workflow, according to one or more embodiments of the present disclosure.

For the purpose of promoting an understanding of the principles of the present disclosure, reference will now be made to the embodiments illustrated in the drawings and specific language will be used to describe the same. It will nevertheless be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to securing and authenticating cryptographic asset ownership. In various embodiments, the present systems and processes generate and use tokenized identity data and randomized unique user identifiers to provide a public-private key infrastructure. In at least one embodiment, the systems and processes implement the public-private key infrastructure to enroll and validate ownership of cryptographic contracts or assets, such as non-fungible tokens (NFTs).

Exemplary Embodiments

Referring now to the figures, for the purposes of example and explanation of the fundamental processes and components of the disclosed systems and processes, reference is made to FIG. 1, which illustrates an exemplary ownership enrollment and ownership verification workflow 100. The exemplary workflow 100 can be performed by one or more embodiments of the present validation systems, such as a validation system 201 as further shown in FIG. 2 and described herein. As will be understood and appreciated, the exemplary workflow 100 shown in FIG. 1 represents merely one approach or embodiment of the present systems and processes, and other aspects may be used according to various embodiments shown and described herein.

In various embodiments, the validation system 201 performs the workflow 100 to enroll a user, and/or computing device 203 thereof, into the validation system 201 such that the user's identity may be used as a proof of ownership of the user's cryptographic asset(s). In one or more embodiments, the validation system 201 performs the workflow 100 to validate ownership of an enrolled owner's cryptographic asset(s) based on a comparison between a user's identity and a stored representation of the identity of the enrolled owner. The proceeding description of the workflow 100 is presented by way of an exemplary scenario enrollment and validation. It will be understood and appreciated that the exemplary scenario is provided for illustrative purposes and is not intended to restrict or limit the scope of the described systems and processes. In the workflow 100 shown in FIG. 1, solid-patterned arrows may correspond to an ownership enrollment portion of the workflow 100 and dashed arrows may correspond to an ownership validation portion of the workflow 100. In some embodiments, one or more of the actions described as being performed by the blockchain environment 206 may be performed by the validation system 201. The actions described as being performed by the validation system 201 may be performed by one or more elements of the validation system 201 shown in FIG. 2 and described herein (see, e.g., communication service 204, encoding service 205, token service 207, matching service 209 shown in FIG. 2 and described herein). Moreover, while various operations are discussed herein as being performed by a validation system 201 that is separate and distinct from the computing device 203, the disclosed technology is not limited to such a scenario. For example, one, some, or all of the steps, operations, or functionalities of the validation system 201 can be performed by the computing device 203 or another device. As a more specific example, an application can be installed on the computing device 203, and the application can be configured to perform one, some, or all of the steps, operations, or functionalities described herein with respect to the validation system 201.

In an exemplary scenario, the validation system 201 can receive identity data 101A from a user via a computing device 203. The identity data 101A can be, or include, biometric information, such as, for example, a facial image of the user, a video recording of the user's face, a fingerprint image of the user's fingerprint, an iris image of the user's iris, an audio recording of the user's voice (e.g., generally, stating a specific word or phrase), a palmprint image of the user's palm, or combinations thereof. The validation system 201 can process the identity data 101A and confirms that the identity data 101A corresponds to a live representation of a user (e.g., the validation system 201 performs one or more proof-of-liveness and/or presentation attack detection processes). The validation system 201 can process the identity data 101A and confirms that the identity data 101A satisfies one or more quality criteria, such as, for example, a resolution threshold, brightness threshold, darkness threshold, contrast threshold, blurriness threshold, feature size threshold, multiple-subject threshold, posture threshold, and combinations thereof.

The validation system 201 can generate a first privacy-secured token 107A based on the identity data 101A (e.g., or processed results obtained therefrom). Upon generating the first privacy-secured token 107A, the validation system 201 can permanently delete the identity data 101A such that identity data of the user is never stored or retained in an original or otherwise recoverable format. The first privacy-secured token 107A (e.g., and second privacy-secured token 107B also shown in FIG. 1) may correspond to the token 213 shown in FIG. 2 and described herein. To generate the first privacy-secured token 107A, the validation system 201 can generate a fixed-size representation (FXR) based on the identity data 107A, such as a vector, co-occurrence matrix, or histogram. The validation system 201 can apply one or more lossy or lossless transformations to the FXR to generate the first privacy-secured token 107A. The validation system 201 can generate a randomized unique user identifier (RUUI) 215A (e.g., also represented throughout the workflow 100 as RUUI 215B, 215C, 215D, 215E). The validation system 201 can store the first privacy-secured token 107A and the RUUI 215A in one or more data stores 105. The data store 105 can correspond to the data store 211 shown in FIG. 2 and described herein. The validation system 201 can complete ownership enrollment by associating the RUUI 215A with the first privacy-secured token 107A such that the RUUI 215A may function as an index for identifying and retrieving the first privacy-secured token 213A from the data store 211. The validation system 201 can transmits a copy of the RUUI 215A (e.g., RUUI 215B) to the user's computing device 203. The validation system 201 associates the RUUI 215A with contact information associated with the user's computing device 203 and/or a user account 212.

The computing device 203 can transmit a request 103 to a blockchain environment 206. The request 103 can be a request to generate or modify a cryptographic asset 217. The request 103 can include a copy of the RUUI 215B, represented in FIG. 1 as RUUI 215C. The request 103 can also include a public key of the user's digital wallet 225 (e.g., which may be the RUUI or a different public key), a signature derived from a private key of the user's digital wallet 225 (e.g., data signed via the first privacy-secured token 213A or a different private key), and a plaintext string (e.g., for verification against the signature, decrypted via the public key).

The blockchain environment 206 can process the request 103 and generate the cryptographic asset 217 (e.g., or modifies the cryptographic asset 217). The blockchain environment 206 can append a copy of the RUUI 215C (e.g., RUUI 215D) to metadata 219 of the cryptographic asset 219 (e.g., or generates the cryptographic asset 219 such that the asset itself includes the RUUI 215D, or an extractable representation thereof). The blockchain environment 206 can associate the cryptographic asset 217 with the user's digital wallet 225 (e.g., by verifying the signature via the public key and plaintext string). The blockchain environment 206 can record the transaction in a public blockchain.

An inquirer system 208 can transmit a request 106 to the validation system 201. The request 106 can include a copy of the RUUI 215D (e.g., RUUI 215E) and a cryptographic contract address associated with the cryptographic asset 217. The request 106 can be a request to validate ownership of the RUUI 215 and, thereby, prove ownership of the digital wallet 225 and cryptographic asset 217. The validation system 201 can process the request 106 to extract the RUUI 215E therefrom.

The validation system 201 can match the RUUI 215E to the RUUI 215A at the data store 105 to verify the RUUI 215E. The validation system 201 can retrieve the first privacy-secured token 107A based on the RUUI 215E (e.g., and/or RUUI 215A, which matches RUUI 215E). The validation system 201 can identify the computing device and/or user account associated with the RUUI 215E and/or the first privacy-secured token 107A (e.g., the user's computing device 203). The validation system 201 can transmit an identity prompt 108 to the user's computing device 203. The identity prompt 108 can be, or can include, a request for collection of identity data and may include instructions for capturing the identity data (e.g., such as an indication of the type of data to be collected, which may be based on the identity data 101A, and/or instructions for the computing device 203 or another system to collect the same). The user can use the computing device 203, or another system, to capture identity data 101B.

The validation system 201 can receive the identity data 101B from the computing device 203. The validation system 201 can process the identity data 101B (e.g., extracting biometric features or other data therefrom, determining proof of liveness, etc.). The validation system 201 can generate a second privacy-secured token 107B based on the identity data 101B (e.g., based on the processed result produced by any processing performed by the validation system). The validation system 201 may generate the second privacy-secured token 107B in a process similar to that performed to generate the first privacy-secured token 107A. The validation system 201 can compare the second privacy-secured token 107A to the first privacy-secured token 107A, such as by computing a similarity metric between the tokens (e.g., cosine similarity, squared Euclidean distance, etc.). The validation system 201 can output a comparison result 109 based on the comparison, such as, for example, a determination of whether the similarity of the tokens satisfies a predetermined similarity threshold.

In this scenario, the comparison result 109 can be a determination that the similarity of the second privacy-secured token 107B to the first privacy-secured token 107A satisfies a predetermined similarity threshold (e.g., a similarity score between the second privacy-secured token 107B and the first privacy-secured token 107A is greater than or equal to a predetermined similarity score threshold). Based on the comparison result 109, the validation system 201 can generate an ownership validation 111. The ownership validation 111 can positively verify the user (e.g., or computing device 203 thereof) as being the owner of the digital wallet 225 and/or the cryptographic asset 117. The ownership validation 111 may be signed by a private key of the validation system 201 and/or include a secret provided by the inquirer system 208 in the request 1-106 (e.g., thereby providing a verifiable security certificate for authenticating the ownership validation 111). The validation system 201 can transmit the ownership validation 111 to the inquirer system 208. Based on the ownership validation 111, the inquirer system 208 may perform one or more appropriate actions, such as providing the computing device 203 access to a digital environment, providing the user access to a physical environment, providing an award to the computing device 203 or digital wallet 225, or initiating a transfer of the cryptographic asset 217.

Based on the ownership validation 111, the validation system 201 may perform one or more appropriate actions, such as re-enrolling the user via the second-privacy secured token 107B (e.g., by storing the second-privacy secured token 107B in the data store 105 in association with the RUUI 215A), transmitting a confirmation of validation to the user's computing device 203, or initiating an enrollment process to transfer or share the ability to prove ownership of the cryptographic asset 217 to or with a second user associated with the inquirer system 208.

While not shown in FIG. 1, the validation system 201 may enroll a second user associated with the inquirer system 208. For example, the validation system 201 receives identity data associated with the second user. The validation system 201 generates a privacy-secured token based on the identity data and generates a second RUUI. The validation system 201 stores the privacy-secured token at the data store 105 in association with the second RUUI. The validation system 201 transmits the second RUUI to the first user's computing device 203. The computing device 203 transmits a request to the blockchain environment 206 to modify the metadata 219 of the cryptographic 217 to include the second RUUI. Following execution of the request, the validation system 201 may validate ownership of the cryptographic asset 217 based on identity data of the first user, the second user, or both (e.g., potentially allowing both users to access the cryptographic asset 217 and/or benefits and privileges associated therewith).

Figure 2:
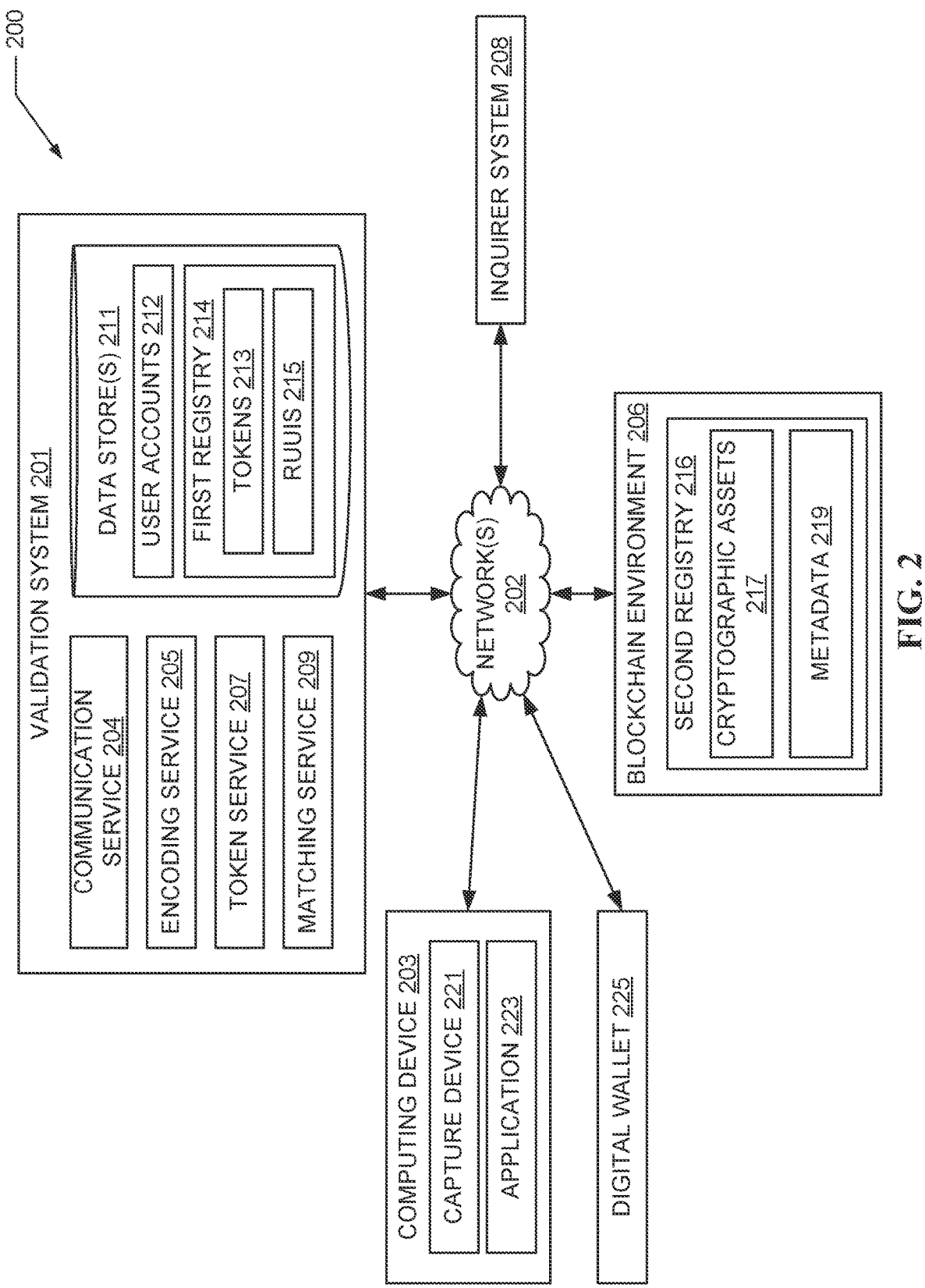
FIG. 2 shows an exemplary network environment in which a validation system may operate, according to one or more embodiments of the present disclosure.

FIG. 2 shows a network environment 201 in which the present validation system 201 may operate. In various embodiments, the validation system 201 is a computing environment that communicates, via a network 202, with one or more computing devices 203, one or more blockchain environments 206, and one or more inquirer systems 208. In one or more embodiments, the validation system 201 performs processes and actions shown and described herein. The validation system 201 can generate fixed-size representations (FXRs) of identity data and generate tokens 213 (e.g., privacy-secured tokens) based on the FXRs. The validation system 201 can generate randomized unique user identifiers (RUUI) 215. The validation system 201 can associate tokens 213 with one or more RUUIs 215. The validation system 201 can store the tokens 213 and RUUIs 215. As shown in FIG. 1 and described herein, the validation system 201 can perform identity verification to validate ownership of cryptographic assets. The validation system 201 can perform one or more embodiments of the ownership enrollment process 300 shown in FIG. 3 and described herein. The validation system 201 can perform one or more embodiments of the ownership validation process 400 shown in FIG. 4 and described herein.

In various embodiments, the validation system 201 secures transfers of cryptographic assets via ownership enrollment and ownership validation. For example, the validation system 201 can perform ownership enrollment by receiving identity data representative of a true owner, generating a first token 213 based on the identity data, associating the first token 213 with a RUUI 215, and associating a cryptographic asset with the RUUI 215 (e.g., via a cryptographic asset generation contract or modification to a cryptographic asset). The validation system 201 can perform ownership validation by receiving the RUUI 215, receiving second identity data associated with a potential owner, generating a second token 213 based on the second identity data, and verifying that the potential owner is the true owner based on a comparison of the second token 213 to the first token 213. The validation system 201 can perform ownership validation to determine whether an action respective to a cryptographic asset may be approved and processed or denied. For example, in response to positively validating cryptographic asset ownership, the validation system 201 may permit (e.g., or cause an external system to permit) transfer of the corresponding cryptographic asset from a first digital wallet to a second digital wallet. As a second example, in response to positively validating cryptographic asset ownership, the validation system 201 may permit a computing device 203 to access a particular digital environment (e.g., or other privileges and/or benefits).

The validation system 201 can include a server computer (e.g., a device including memory and one or more processors for executing instructions stored on the memory), or any other system providing computing capability. Alternatively, the computing environment may employ a plurality of computing devices that may be arranged, for example, in one or more server banks or computer banks or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time. Various applications and/or other functionality may be executed in the validation system 201, according to various embodiments. The validation system 201 can include, but is not limited to, a communication service 204, an encoding service 205, a token service 207, a matching service 209, and one or more data stores 211. Various data are stored in the data store(s) 211 that are accessible to the validation system 201. The data store 211 can be representative of a plurality of databases as can be appreciated. The data store 211, or elements thereof, can be server-based or blockchain-based. The data stored in the data store 211, for example, may be associated with the operation of the various applications and/or functional entities described below. The data store 211 can include, but is not limited to, user accounts 212, one or more first registries 214, tokens 213, and randomized unique user identifiers (RUUIs) 215.

In various embodiments, the data stored in the data store 211 includes, but is not limited to, parameters for processing identity data (e.g., quality thresholds, normalization functions, processing filters, etc.), parameters for generating fixed size representations (FXRs) of identity data (e.g., transformation parameters, such as salt values, projection matrices, and pseudorandom seeds for generating the same), parameters for generating tokens 213 (e.g., blending parameters, nonce or other salt values, key derivation functions, etc.) and parameters for generating or modifying metadata 219 (e.g., to append, modify, or remove RUUIs 215). In one or more embodiments, the data store 211 does not store any original identity data, thereby reducing a risk of ex-posing information that may be useful to counterfeiters (e.g., if the data store 211 were compromised or breached). In at least one embodiment, the data store 211 stores one or more datasets that define properties 221 for collecting object data 219. In some embodiments, the data store stores identity data in an encrypted format and/or at a remote server accessible only to the validation system 201. In one or more embodiments, the data store 211 is centrally-based, cloud-based, or blockchain-based, or includes combinations thereof (e.g., the user accounts 212 may be stored in a server and one or more first registries 214 may be blockchain-based).

In various embodiments, the data store 211 includes, but is not limited to, user accounts 212 and one or more first registries 214. In various embodiments, the user account 212 includes credentials for associating a user and/or computing device 203 with the user account 212. In at least one embodiment, the user account 212 includes credentials for associating the user account 212 with one or more digital wallets 225. For example, the user account 212 includes a user identifier associated with the validation system 201, a public wallet address associated with a user's digital wallet 225, and device data associated with the user's computing device 203 (e.g., contact information, media access control (MAC) address, internet protocol (IP) address, serial number, firmware version, etc.). In one or more embodiments, the user account 212 includes RUUIs associated with cryptographic assets 217 owned by a particular user. In various embodiments, the user account 212 includes user-adjustable and/or contract-fixed settings for types of identity data used in generation of tokens 213. For example, the user account 212 includes a user setting that establishes requisite identity data of a facial image and a key phrase. In another ex-ample, the user account 212 includes fixed identity data settings for generating or modifying cryptographic assets 217 that are associated with a particular contract for generating cryptographic assets. For example, a fixed identity data setting for a particular contract may include a requirement for identity data to include a facial image, a fingerprint image, or a voice recording.

In various embodiments, the first registry 214 includes, but is not limited to, tokens 213 and RUUIs 215. In at least one embodiment, the first registry 214 includes associations between tokens 213 and RUUIs 215 (e.g., such that a particular RUUI 215 may serve as an index to a particular token 213, or vice versa, including subsequently generated tokens 213 associated with the same identity data as a stored token 213). In one or more embodiments, the first registry 214 is a permissioned blockchain or other cryptographically verified distributed ledger. In some embodiments, the data store 211 includes a different first registry 214 for each user account 212. In at least one embodiment, the data store 211 includes a different first registry 214 for each asset contract with which cryptographic assets 217 are associated.

In one or more embodiments, the tokens 213 include anonymized vector representations as shown and described herein (e.g., or as shown and described in one or more disclosures incorporated by reference herein). In various embodiments, the token 213 is cancellable (e.g., the token 213 can be revoked and the user associated therewith can be re-enrolled). In at least one embodiment, the token 213 satisfies various security standards including, but not limited to, irreversibility, unlinkability, and ability to be processed at scale and speed (e.g., the token 213 pre-serves token matching performance at scale and speed without significant impact to matching accuracy). In various embodiments, the token 213 may function as a user's private key for validating ownership of cryptographic assets 217 and digital wallets 225.

In various embodiments, the RUUI 215 is an identifier generated by the token service 213 based on a pseudorandom seed or other secret. In at least one embodiment, the RUUI 215 may be associated with the token 213 such that the RUUI 215 functions as a user's public key for validating ownership of cryptographic assets 217 and digital wallets 225. In some embodiments, the validation system 201 may revoke an RUUI 215 by dissociating the RUUI 215 from a token 213 (e.g., or revoke a token 213 by dissociating the token 213 from the RUUI 215).

In various embodiments, the communication service 204 receives and processes data from the computing device 203, the blockchain environment 206, the inquirer system 208, and the inquirer system 208. In one or more embodiments, the communication service 204 receives requests to enroll a user into the validation system 201 (e.g., including, but not limited to, registering a user account 212 for the user, generating a token 213 and RUUI 215 for the user, etc.). In various embodiments, the communication service 204 receives requests to generate, modify, or revoke RUUIs 213 or tokens 213. In in at least embodiment, the communication service 204 receives requests to validate asset ownership from the inquirer system 208 or the blockchain environment 206. In one or more embodiments, the communication service 204 enforces approval or disapproval policies for permitting or denying system services to computing devices 203, blockchain environments 206, and/or inquirer systems 208.

In at least one embodiment, the communication service 204 receives identity data from the computing device 203, or other capture device 221 in communication therewith. In one or more embodiments, identity data includes, but is not limited to, biometric data, personal identifiable information (PII) data, and device data. In various embodiments, biometric data includes, but is not limited to, facial images, fingerprint images, palm print images, iris scans, hand images, vasculature scans, and biological signals (e.g., vitals, speech signals, voice recordings, etc.). In at least one embodiment, PII data includes, but is not limited to, driver's license number, social security number, address, name, contact information, username, and medical data. In one or more embodiments device data includes, but is not limited to, network identifier(s), device identifier(s), model number, device serial number, Subscriber Identity Module (SIM) number, build serial number, USB serial number, telephone number, International Mobile Equipment Identity (IMEI) number, Mobile Equipment identifier (MEID) number, electronic serial number (ESN), and international mobile subscriber identity (IMSI) number. Other non-limiting examples of the particular data include media access control (MAC) address, Bluetooth address, internet protocol (IP) address, subnet, subnet mask, device language, device display dimensions, device display resolution, and display color depth.

In various embodiments, the communication service 204 processes identity data to generate secondary identity data suitable for processing by the encoding service 205 or token service 207. In at least one embodiment, the communication service 204 performs biometric feature detection and extraction to identify and extract particular biometric features in an image (e.g., face, nose, iris, ears, mouth, finger, etc.). In one or more embodiments, the communication service 204

In one or more embodiments, the communication service 204 performs anatomy detection, alignment, and cropping processes to generate anatomical images. In at least one embodiment, the communication service 204 performs liveness detection, presentation attack detection, and/or quality assessment on the identity data. For example, the communication service 204 can analyze the identity data, and/or transmission or request associated therewith, to generate a liveness score. The communication service 204 can compare the liveness score to a predetermined liveness threshold and, in response to the liveness score satisfying the threshold, determine that the identity data is associated with a live subject. In another example, the communication service 204 can process a biometric image from the identity data to generate one or more quality scores, such as a resolution score, a sharpness score, a magnification score, a brightness score, a contrast score, a blurriness score, a multi-subject score, and a pose estimation score. The communication service 204 can perform proof of liveness, presentation attack detection, and quality assessment processes according to one or more embodiments described in the disclosures incorporated herein by reference. For example, the communication service 204 can perform proof of liveness and presentation attack detection processes according to one or more embodiments shown or described in U.S. Pat. No. 10,635,894, filed Oct. 13, 2017, entitled "SYSTEMS AND METHODS FOR PASSIVE-SUBJECT LIVENESS VERIFICATION IN DIGITAL MEDIA," the disclosure of is incorporated herein by reference in its entirety.

In various embodiments, the communication service 204 transmits requests (e.g., "prompts" to the computing device 203). In one or more embodiments, the communication service 204 transmits a request to the computing device 203 to collect and transmit identity data. In at least one embodiment, the communication service 204 transmits a request to the computing device 203 to approve or deny a request from an inquirer system 208 (e.g., a request to validate asset ownership, request to transfer a cryptographic asset 217 from a first digital wallet to a second digital wallet, request to modify metadata 219 of a cryptographic asset 217, etc.). In various embodiments, the communication service 204 transmits alerts to the computing device 203. For example, the communication service 204 can transmit an alert to the computing device 203 in response to the validation system 201 failing to match a probe token 213 to an enrollment token 213. As another example, the communication service 204 can transmit an alert to the computing device 203 in response to the validation system 201 receiving a request from a suspicious inquirer system 208 (e.g., an inquirer system 208 associated with a block list, one or more historical attacks, etc.).

In one or more embodiments, the encoding service 205 generates fixed-size representations (FXRs) of string-formatted data, such as text strings. Non-limiting examples of the FXR include vectors and histograms. In at least one embodiment, the encoding service 205 encodes a text strings into one or more vector representations. For example, the encoding service 205 can encode a driver's license number into a fixed-length vector. In one or more embodiments, the encoding service 205 encodes a text string into two or more discrete representations (e.g., bi-grams or other n-grams). In various embodiments, the encoding service 205 maps the two or more discrete representations onto a co-occurrence matrix that represents a distribution of the discrete representation values. The encoding service 205 may apply one or more smoothing functions to the co-occurrence matrix. In one or more embodiments, the encoding service 205 applies Gaussian kernels of varying width to the co-occurrence matrix, thereby generating a plurality of Gaussian-transformed co-occurrence matrices. In at least one embodiment, the encoding service 205 performs a linear kernel combination of the Gaussian-transformed co-occurrence matrices to generate a smoothed co-occurrence matrix. In at least one embodiment, the encoding service 205 performs a normalization operation on the smooth co-occurrence matrix to generate a unit normalized vector (e.g., which may be an input to the token service 207 for generation of a token 213). The encoding service 205 can encode identity data FXRs according to one more embodiments described in U.S. application Ser. No. 17/719,975, filed Apr. 13, 2022, entitled, "PERSONALLY IDENTIFIABLE INFORMATION ENCODER," which claims the benefit of and priority to U.S. Application No. 63/174,405, filed Apr. 13, 2021, entitled "PERSONALLY IDENTIFIABLE INFORMATION ENCODER," the disclosure of which is incorporated herein by reference in its entirety.

In one or more embodiments, the token service 207 generates fixed-size representations (FXRs), tokens 213 (e.g., privacy-secured tokens), and randomized unique identifiers (RUUIs) 215. In various embodiments, the token service 207 receives identity data from the communication service 204, generates one or more FXRs based on the identity data, and generates one or more tokens 213 based on the FXR(s). In at least one embodiment, the token service 207 receives FXRs from the encoding service 205 and transforms the FXRs into tokens 213. In one or more embodiments, the token service 207 generates RUUIs 215. In various embodiments, the token service 207 stores the token 213 in association with the RUUI 215 in one or more registries 214 of the data store 211. In at least one embodiment, the token service 207 stores the RUUI 215 at the data store 211 in association with a user account 212.

In one example, the token service 207 can receive a facial image of a subject. The token service 207 can generate an FXR based on the facial image. The token service 207 can generates a token 213 based on the FXR via a lossy tokenization process. The token service 207 can generate an RUUI 215 (e.g., based on a pseudorandom seed or a secret value associated with the subject's user account 212 or computing device 203). The token service 207 can store the token 213 and the RUUI 215 as a combined entry or separate, linked entries in a registry 214.

The token service 207 can perform digital conversion, hashing, and other suitable processes for translating identity data from a variable-size representation to a fixed-size representation. The token service 207 can generate fixed-size representations based on one or more transformation parameters, and can define the one or more transformation parameters based on a pseudo-randomly generated value (e.g., referred to as a pin or a seed value) or other secret data, such as, for example, a user account identifier, an identifier associated with a subject's computing device 203, or a keyword or phrase received from the computing device 203. Non-limiting examples of transformation parameters, include salt values that may be added to object data (e.g., for increasing the security of the fixed-size representation) and spherical whitening parameters. In one or more embodiments, the tokens 213 generated by the token service 207 demonstrate security properties including revocability, renewability, diversity, non-linkability, and irreversibility.

In various embodiments, the token service 207 generates a token 213 by concatenating a fixed-size representation (FXR) with a cryptographic key (e.g., from a pseudo-randomly seeded cryptographic key derivation function), or other secret data, to generate a concatenated representation. In at least one embodiment, the token service 207 seeds a cryptographic key derivation function based on an RUUI 215, a public or private address of a user's digital wallet 225, or device data associated with the user's computing device 203. In one or more embodiments, the token service 207 permutes the concatenated representation with the FXR and/or the cryptographic key to generate a permuted representation. In at least one embodiment, the token service 207 generates one or more transformation parameters and projects the permuted representation based on one or more transformation parameters to generate the token 213.

In one example, the token service 207 can generate a pseudorandom projection matrix based on a seed value (e.g., which may be pseudorandomly generated based on a seeding via a received or retrieved key or other secret data). The token service 207 can multiply an FXR of identity data by the pseudorandom projection matrix to generate a token 213 (e.g., a lossy, irreversible, privacy-secured token). According to one embodiment, the token 213 generated by the token service 207 can be revoked and replaced with new tokens. In at least one embodiment, old and the new tokens cannot be linked together (e.g., a security property referred to as "non-linkability").

In one or more embodiments, the token service 207 applies a whitening transformation (e.g., such as an iterative spherical whitening transformation) to FXRs prior to converting the FXRs to tokens 213. According to one embodiment, the whitening transformation improves token security by increasing a difficulty of reversing an irreversible transformation or reconstructing identity data with which a token 213.

In at least one embodiment, the token service 207 (e.g., and/or the encoding service 205 generates multi-factor and/or multimodal tokens 213 via blending FXRs associated with different types of identity data (e.g., different biometric features, different personal identifiable data, different device data, and combinations thereof) to generate a blended FXR and generating a token 213 based thereon. In one or more embodiments, the token service 207 performs direct blending. According to one embodiment, direct blending includes simultaneous blending of all FXR modalities to be included in the output FXR (e.g., a blended FXR). In other words, in direct blending, the token service 207 can perform simultaneous blending of all input FXRs. In at least one embodiment, the token service 207 performs sequential blending. In various embodiments, sequential blending includes blending a first modal FXR with a secret (e.g., a PIN, or another fixed size representation or privacy-secured token thereof) to generate a first blended representation and blending the first blended representation with one or more FXRs of other identity data modalities. In other words, in sequential blending, the token service 207 can perform step-wise blending of inputs in which a first input FXR is blended with a secret and the output thereof is blended with a second input FXR (e.g., the output FXR thereof potentially being blended with a third input and so on for any suitable number of inputs). In one example, the token service 207 generates a token 213 based on a combination of first type biometric data and second type biometric data. In another example, the token service 207 generates a token 213 based on a combination of biometric data and personal identifiable data, such as a driver's license number. In another example, the token service 207 generates a token 213 based on a combination of biometric data and a device identifier. In another example, the token service 207 generates a token 213 based on a combination of personal identifiable information (PII) data and a device identifier. In another example, the token service 207 generates a token 213 based on a combination of first type PII data and second type PII data. In another example, the token service 207 generates a token 213 based on a combination of first type device data and second type device data. In another example, the token service 207 generates a token 213 based on a combination of biometric data, PII data, and device data.

In one or more embodiments, the token service 207 generates the token 213 according to one or more embodiments described in:

U.S. application Ser. No. 16/406,978, filed May 8, 2019, entitled "SYSTEMS AND METHODS FOR ENHANCED HASH TRANSFORMATIONS," which claims the benefit of and priority to:

U.S. Application No. 62/829,825, filed Apr. 5, 2019, entitled "EVERGREEN HASH"; and U.S. Application No. 62/668,576, filed May 5, 2018, entitled "THE EVERGREEN HASH";

U.S. application Ser. No. 17/230,684, filed Apr. 14, 2021, entitled "SYSTEMS AND METHODS FOR MULTI-MODAL BIOMETRICS," which claims the benefit of and priority to:

U.S. Application No. 63/009,809, filed Apr. 14, 2020, entitled "SYSTEMS AND PROCESSES FOR TOUCH-LESS BIOMODAL BIOMETRICS"; and U.S. Application No. 63/011,447, filed Apr. 17, 2020, entitled "SYSTEMS AND PROCESSES FOR TOUCH-LESS BIOMODAL BIOMOETRICS"; or U.S. application Ser. No. 16/841,269, now U.S. Pat. No. 11,301,586, filed Apr. 6, 2020, entitled "SYSTEMS AND METHODS FOR LOSSY BIOMETRIC REPRESENTATIONS," which claims the benefit of and priority to U.S. 62/829,825, filed Apr. 5, 2019, entitled "THE EVERGREEN HASH", each of which are incorporated herein by reference as if fully set forth in their entireties.

In one or more embodiments, the matching service 209 compares tokens 213 to determine whether they are associated with the same identity data or subject (e.g., a user, a user account 212, the user's computing device 203, or a combination thereof). In one or more embodiments, the matching service 209 performs token matching processes including, but not limited to, one-to-one (1:1) comparisons for validation and one-to-many (1:N) comparisons for identification and/or database deduplication. In at least one embodiment, the matching service 209 performs one-to-one and one-to-many comparisons of tokens 213 for the purposes of validating ownership of a cryptographic asset 217 and/or digital wallet 225. According to one embodiment, the matching service 209 performs a comparison by calculating a similarity metric (e.g., a squared Euclidean distance, L2 norm, cosine similarity value, etc.) between a first token 213 (e.g., a "probe" token) and one or more previously generated tokens 213 (e.g., "enrollment" tokens 213). In at least one embodiment, the policy service 213 applies a policy 223 to the comparison by determining whether the similarity metric (e.g., referred to as a similarity score) satisfies a predetermined threshold. In some embodiments, the matching service 209 compares a probe token 213 to two or more enrollment tokens 213 that are associated with the same RUUI 215. In various embodiments, the matching service 209 combines similarity scores via weighted or unweighted averaging to generate a multi-token, fusion-based score.

In one example, to perform authenticity authentication, the matching service 209 can generate a probe token 213. The matching service 209 can receive an RUUI 215 and retrieve an enrollment token 213 from a first registry 214 based on the RUUI 215. The matching service 209 can compute a similarity score between the probe token 213 and the enrollment token 213. The matching service 213 can determine that the similarity score meets a minimum similarity threshold (i.e., the similarity score is greater than or equal to the minimum similarity threshold), and, based thereon, the matching service 209 can positively verify that the subject associated with the probe token 213 is the same subject associated with the enrollment token 213.

In some embodiments, the validation system 201 or the application 223 generates or modifies, or causes the blockchain environment 206 to generate or modify, a cryptographic asset 217 (e.g., a non-fungible token (NFT)). For example, the validation system 201 generates a cryptographic asset 217 that includes metadata 219. In this example, the validation system 201 appends an RUUI 215 to the metadata 219. In another example, the validation system 201 commands the blockchain environment 206 to modify metadata 219 of a cryptographic asset 217 to include an RUUI 215. In at least one embodiment, generating the cryptographic asset 217 includes providing a media file (e.g., video, image, audio, multimedia, text, etc.) and metadata 219 to an asset generating (e.g., "asset minting") platform, which may be the blockchain environment 206. In at least one embodiment, generating the cryptographic asset 217 includes determining a blockchain onto which the cryptographic asset 217 will be recorded, uploading the media file to the cryptographic asset generation platform associated with the blockchain and providing a payment to the cryptographic asset generation platform (e.g., in the form of cryptocurrency). In various embodiments, generating the cryptographic asset 217 includes causing the blockchain to concatenate records containing cryptographic hashes—sets of characters that identify the cryptographic asset 217 (e.g., the media file and the metadata 219) and other cryptographic assets—onto previous records, thereby creating a chain of identifiable data blocks.

In various embodiments, the computing device 203 generally refers to electronic systems and devices that capture, process, store, and/or perform actions based at least in part on identity data. In at least one embodiment, the computing device 203 includes any capture device or system in communication with a capture device 221 (e.g., such as an onboard camera, an Internet of Things (IoT) device, a surveillance system connected to one or more security cameras, etc.). Non-limiting examples of the computing device 203 include mobile devices (e.g., such as smartphones, tablets, smart accessories, etc.), laptops, security devices, network-enabled camera systems, and Internet of Things (IoT) devices. In various embodiments, the computing device 203 includes an application 223 for accessing services and functions of the validation system 201 and the blockchain environment 206, and for transmitting data therebetween. In some embodiments, enrolling a user into the validation system 201 includes installing and/or registering the application 223 to the computing device 203. In one or more embodiments, the application 223 is associated with accessing and controlling a user's digital wallet 225. In some embodiments, the application 223 is representative of a plurality of different applications. For example, a first application 223 may be associated with accessing services of the validation system 201 and a second application 223 may be associated with accessing services of the blockchain environment 206. In one or more embodiments, enrolling a user into the validation system 201 may include associating a first user account 212 of a first application 223 with a second user account 212 of a second application 223.

In one or more embodiments, the application 223 generates and causes the computing device 203 to render user interfaces for accessing services and functions of the validation system 201 or blockchain environment 206, for rendering instructions and other information from the validation system 201 or blockchain environment 206, and for receiving input from the user (e.g., selections to fields, typed input, etc.). In one example, the application 223 generates a user interface including alignment and lighting instructions for capturing a biometric image. In one or more embodiments, the computing device 203 includes memory for storing various data, such as, for example, RUUIs 215, pseudonymous identifiers, and encrypted data. In one example, the memory 108 stores scannable media (e.g., a QR code, barcode, etc.) that includes an RUUI 215.

In at least one embodiment, the computing device 203 includes one or more capture device 221s, such as a scanner, camera, microphone, touch screen, keyboard, and other input recording devices. In various embodiments, the capture device 221 captures biometric data, such as facial scans or fingerprint images, and transmits the biometric data to the computing environment 101. In at least one embodiment, the application 223 receives biometric data, such as images or other files, and processes the biometric data through a biometric matcher (e.g., according to a particular capture software development kit (SDK) and a particular matcher SDK). In one or more embodiments, the capture device 221 receives user inputs for personal identifiable data (PII). In at least one embodiment, the application 223 retrieves PII data from memory of the computing device 203. In various embodiments, the capture device 221 accesses device data associated with the computing device 203 (e.g., and the application 223 transmits the device data to the validation system 201).

The network 202 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. For example, the validation system 201 can communicate with a first computing device 203 over a first network 202 and communicate with a second computing device 203 over a second network. In this example, the first computing device 203 and first network 202 can be associated with a first vendor system and the second computing device 203 and second network can be associated with a second vendor system, distinct from the first vendor system.

In one or more embodiments, the blockchain environment 206 includes any computing environment or network capable of generating (e.g., minting) cryptographic assets 217, maintaining blockchain ledgers of assets, and/or providing a marketplace for asset-related transactions. In at least one embodiment, the blockchain environment 206 may include online platforms where non-fungible tokens (NFTs) can be generated, displayed in a marketplace, and traded or purchased. In some embodiments, the blockchain environment 206 includes or is associated with a merchant computing environment for marketing and selling physical objects (e.g., with which NFTs may be associated). In one or more embodiments, the blockchain environment 206 can generate and modify metadata 219. For example, the blockchain environment 206 can modify metadata 219 to include an RUUI 215 associated with a token 213. In another example, the blockchain environment 206 can modify the metadata 219 to include a digital record of RUUI provenance (e.g., a record of historical and current RUUIs 215 associated and disassociated with the cryptographic asset 217).

In various embodiments, the blockchain environment 206 includes one or more second registries 216. In one or more embodiments, the second registry 216 is a blockchain or other distributed ledger. In at least one embodiment, the second registry 216 includes cryptographic assets 217 and metadata 219 thereof. In various embodiments, the blockchain environment 206 includes and executes contracts for generating, modifying, and controlling possession of cryptographic assets 217. In one example, the blockchain environment 206 includes contracts for generating cryptographic assets in an ERC-721 or ERC-1155 standard. In one or more embodiments, the blockchain environment 206 records ownership of cryptographic assets 217, such as, for example, an association between a cryptographic asset 217 and a digital wallet 225 (e.g., or public wallet address thereof).

In one or more embodiments, cryptographic assets 217 are transferable digital representations that may designed in a manner that prohibits their copying or duplication. In various embodiments, the cryptographic asset 217 includes, but is not limited to, non-fungible tokens (NFTs), security tokens, utility tokens, cryptocurrency, cryptocurrency funds, cryptocurrency exchange-traded funds (ETFs), decentralized applications (e.g., including user accounts thereof), and stablecoins. In at least one embodiment, the metadata 219 includes information associated with the corresponding asset. The metadata 219 can include, for example, asset name, asset images, asset description and properties, uniform resource identifiers associated with the asset, uniform resource locator (URL) addresses associated with the asset, and other information. In various embodiments, via the present systems and processes, the metadata 219 includes one or more RUUIs 215.

In one or more embodiments, the digital wallet 225 includes any device or program that allows a user to purchase, transfer, sell, exchange, and/or store cryptographic assets 217, or cryptographic keys associated with ownership thereof (e.g., public and private wallet keys). In at least one embodiment, the digital wallet 225 includes one or more cryptographic keys for controlling cryptographic assets 217 held on one or more second registries 216. The digital wallet 225 can include a public wallet address. The validation system 201 can associate a user account 212 with the digital wallet 225 based on receiving and storing the public wallet address.

In various embodiments, the inquirer system 208 may be any computing device or resource that communicates with the validation system 201, the computing device 203, and/or the blockchain environment 206. In at least one embodiment, the inquirer system 208 may be a second user's computing device 203. In one or more embodiments, the inquirer system 208 may be a system or device associated with cryptographic asset ownership, such as, for example, cryptographic asset trading platforms or digital wallet systems. In various embodiments, the inquirer system 208 may be a system or device associated with providing benefits and privileges of owning a particular cryptographic asset 217. For example, the inquirer system 208 may be a digital environment in which access to the digital environment is controlled based on possession of a particular NFT. In at least one embodiment, the inquirer system 208 may be a second user's digital wallet 225 (e.g., or a second digital wallet 225 owned by the same user as a first digital wallet 225 with which a cryptographic asset is associated).

Figure 3:
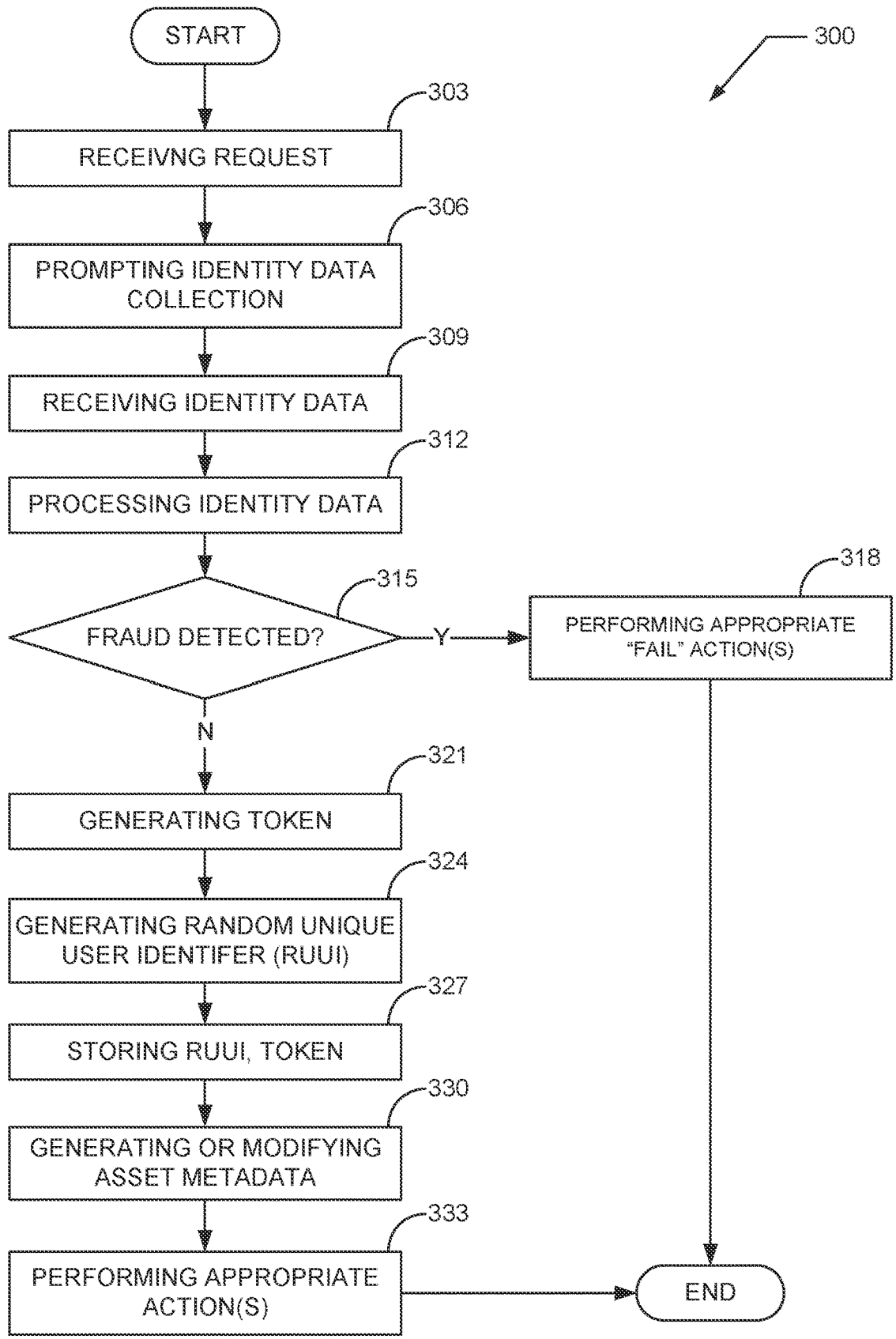
FIG. 3 shows an exemplary ownership enrollment process, according to one or more embodiments of the present disclosure.

FIG. 3 shows an exemplary ownership enrollment process 300 that may be performed by one or more embodiments of the present validation system, such as the validation system 201 shown in FIG. 2 and described herein. As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown.

At step 303, the process 300 includes receiving a request. In at least one embodiment, the communication service 204 receives the request from a computing device 203 or an application 223 running thereon or accessed thereby. In some embodiments, the communication service 204 receives the request in response to the computing device 203 installing the application 223. In one or more embodiments, the communication service 204 receives the request in response to the application 223 initiating a registration operation or startup process. In at least one embodiment, the communication service 204 receives the request from the computing device 203, blockchain environment 206, or digital wallet 225 in response to a transfer of ownership of a cryptographic asset 217 from a first digital wallet 225 to a second digital wallet 225 (e.g., the second digital wallet 225 being a digital wallet associated with a user of the computing device 203).

In some embodiments, the request is automatically generated at the validation system 201 or application 223. In at least one embodiment, the validation system 201 determines that a user setting for re-enrollment interval (e.g., 1 month, 1 year, or any suitable interval) has elapsed and, in response, generates the request. In one or more embodiments, the validation system 201 automatically generates the request in response to determining that a timeframe (e.g., associated with a security policy of the validation system 201 and/or application) for refreshing or swapping identity data has elapsed (e.g., following a suitable interval after token generation, such a 1 year, 6 months, or any suitable period). In various embodiments, the validation system 201 automatically generates the request in response to detecting an attempted attack, such as a presentation attack or credential login failure. In one or more embodiments, the validation system 201 automatically generates the request in response to determining that the application 223 has been initiated on an unrecognized computing device 203 (e.g., based on associations of a user account 212 with a recognized computing device 203). In some embodiments, the request includes a seed value or secret for seeding generation of a RUUI 215.

At step 306, the process 300 includes prompting a user to collect identity data via the computing device 203, or another capture system. In various embodiments, the communication service 204 transmits a prompt to the computing device 203. In some embodiments, the communication service 204 causes the application 223 to render a prompt on one or more displays of the computing device 203. In at least one embodiment, the prompt includes instructions for collecting identity data and transmitting the identity data to the validation system 204. For example, the prompt includes an instruction to capture a facial image (e.g., a selfie). In one or more embodiments, the prompt includes requirements for capturing the identity data, such as a frame for collecting biometric data or a predetermined posture or action to be provided in the biometric data. In various embodiments, the prompt includes instructions formatting requirements for collecting personal identifiable information (PII) data, such as a character length, date format, or identifier format. In one or more embodiments, the prompt causes the application 223 to automatically collect device data from the computing device 203 and transmit the device data to the validation system 204.

In one or more embodiments, the prompt includes lighting instructions for capturing biometric data of sufficient quality. In various embodiments, the prompt includes instructions to capture a particular biometric (e.g., which may be specified in the request of step 303, retrieved from a user account 212, or specified by a cryptographic asset contract).

At step 309, the process 300 includes receiving identity data. In one or more embodiments, the communication service 204 receives the identity data from the computing device 203. In some embodiments, the communication service 204 receives the identity data from a second computing device 203 (e.g., the second computing device 203 providing the identity data in response to a command from the first computing device 203). In various embodiments, the communication service 204 receives one or more media files, such as photos, videos, and/or audio recordings. In at least one embodiment, the communication service 204 receives inputs to the computing device 203, such as PII data strings.

In one or more embodiments, the identity data includes biometric data, such as, for example, facial image or video, fingerprint image, palm print scan, audio recording, biological signals (e.g., heart rate, respiratory rate, DNA etc.), or behavioral data (e.g., touch pattern, keystroke pattern, cursor patterns, signatures). In various embodiments, the identity data includes device data, such as device serial number, MAC address, or IP address. In at least one embodiment, the identity data includes an address, social security number, phone number, email, username, password, other credential. In one or more embodiments, the identity data includes an image or video of an identity document, such as a passport, driver's license, or state identification card. In various embodiments, the identity data includes one or more images, videos, and/or measurements of a physical object (e.g., a totem, work of art, etc.).

At step 312, the process 300 includes processing the identity data. In various embodiments, the communication service 204 processes the identity data. In at least one embodiment, the communication service 204 extracts biometric data from the identity data, such as particular biometric features. In one or more embodiments, the communication service 204 performs feature detection, feature mapping, and/or pose estimation processes. In various embodiments, the communication service 204 performs one or more presentation attack detection processes on the identity data, such as, for example, a proof of liveness process for determining whether the identity data was obtained from a live subject.

In at least one embodiment, the communication service 204 performs one or more quality analyses for factors including, but not limited to, sharpness, brightness, contrast, resolution, posture, expression, gesture, face or other feature obfuscation, and multiple subject presence. In one or more embodiments, the communication service 204 generates one or more quality scores that quantify the results of evaluating the identity data for one or more factors.

At step 315, the process 300 includes determining whether the identity data of step 309 is fraudulent. Fraudulence may refer to the identity data being associated with an attack, such as a presentation attack. Fraudulence may refer to the identity data failing to demonstrate sufficient quality for processing by the encoding service 205 or token service 207. In one or more embodiments, the communication service 204 compares a liveness score to a predetermined threshold. In at least one embodiment, in response to the liveness score failing to meet the predetermined threshold, the communication service 204 determines that the identity data associated therewith is fraudulent. In various embodiments, in response to the liveness score satisfying the predetermined threshold, the communication service 204 determines that the identity data associated therewith is not fraudulent. In one or more embodiments, the communication service 204 compares one or more quality scores to one or more predetermined thresholds. In at least one embodiment, in response to a quality score failing to meet a predetermined threshold, the communication service 204 determines that the identity data is fraudulent.

In various embodiments, in response to a detection of fraud in the identity data, the process 300 proceeds to step 318. In one or more embodiments, in response to a failure to detect fraud in the identity data, the process 300 proceeds to step 321.

At step 318, the process 300 includes performing one or more appropriate "fail" actions. In at least one embodiment, the communication service 204 transmits an alert to the computing device 203 indicating the identity data is fraudulent and/or of insufficient quality. In one or more embodiments, the communication service 204 transmits an instruction to the computing device 203 to recapture or recollect the identity data. In various embodiments, the communication service 204 transmits one or more quality notifications that indicate deficiencies in the fraudulent data (e.g., insufficient lighting, incorrect posture, improper formatting, multiple subjects, obscured features, etc.). In some embodiments, the communication service 204 automatically stores the fraudulent identity data in a user account 212 associated with the computing device 203. In one or more embodiments, the communication service 204 transmits an alert to a second computing device 203 associated with the user account 212. In one or more embodiments, the communication service 204 transmits an alert to the user via one or more communication paths. For example, the communication service 204 can transmit the alert to an online portal accessible to the computing device 203 and/or the user account 212. In another example, the communication service 204 can transmit the alert to an email address associated with the computing device 203 and/or user account 212. In another example, the communication service 204 can transmit the alert to a second computing device 203 associated with an administrator or controlling entity associated with the user account 212 and/or computing device 203 (e.g., an information technology department, threat monitoring service, etc.). In at least one embodiment, the communication service 204 can transmit the alert via a secondary communication channel and/or to a second computing device 203 or administrator in response to determining a number of enrollment attempts exceeds a predetermined threshold and/or that a requesting computing device 203 is associated with one or more suspicious factors (e.g., geolocation, network activity, device data, etc.).

At step 321, the process 300 includes generating one or more tokens 213 based on the identity data. In various embodiments, the encoding service 205 encodes the identity data into one or more fixed-size representations (e.g., if the identity data includes text string data, or if text string data is generated via processing the identity data, such as by optical character recognition or natural language processing). In one or more embodiments, the token service 207 generates one or more fixed-size representations (FXRs) based on the identity data. In various embodiments, the token service 207 generates multimodal and/or multi-factor FXRs via direct or sequential blending.

In one or more embodiments, the token service 207 generates one or more tokens 213 based on one or more FXRs generated from the identity data. In at least one embodiment, the token service 207 generates multimodal and/or multi-factor tokens 213 via direct or sequential blending.

At step 324, the process 300 includes generating a randomized unique user identifier (RUUI) 215. In various embodiments, the token service 207 generates the RUUI 215 based on a pseudorandom seed value and a random number generator (RNG) algorithm, model, and/or technique. In some embodiments, the token service 207 stores the pseudorandom seed value at the data store 211 (e.g., such as in the user account 212 associated with the user's computing device 203). In at least one embodiment, the token service 207 generates the RUUI 215 based on a seed value or secret received from the computing device 203.

At step 327, the process 300 includes storing the token 213 and the RUUI 215 in the first registry 214. In various embodiments, the token service 207 generates a new entry in the first registry 214, the new entry including the RUUI 215 and the token 213. In at least one embodiment, the token service 207 initiates a blockchain transaction to record the RUUI 215 and the token 213 at the first registry 214. In one or more embodiments, the communication service 204 transmits the RUUI 215 to the computing device 203. In various embodiments, the communication service 204 generates and, transmits to the computing device 203, scannable media that includes the RUUI 215 (e.g., a barcode, QR code, etc.). In some embodiments, the communication service 204 transmits the token 213 to the computing device 203. In one or more embodiments, the communication service 203 transmits the RUUI 215 to one or more blockchain environments 206.

At step 330, the process 300 includes generating or modifying metadata 219 of a cryptographic asset 217. In some embodiments, step 330 includes generating the cryptographic asset 217. In various embodiments, the computing device 203, or communication service 204, transmits an asset generation or modification request to the blockchain environment 206. In one or more embodiments, the request includes the RUUI 215 and instructions and/or payment processing details for generating the cryptographic asset 217. In some embodiments, the request includes an identification of a particular cryptographic asset 217 and/or metadata 219. In various embodiments, the request includes a public wallet address of the user's digital wallet 225 and a signature derived from the private wallet address of the user's digital wallet 225. In at least one embodiment, in response to the request, the blockchain environment 206 generates a cryptographic asset 217 and metadata 219 that includes the RUUI 215. In some embodiments, in response to the request, the blockchain environment 206 modifies metadata 219 of an existing cryptographic asset 217 to include the RUUI 215. In various embodiments, the blockchain environment 206 associates ownership of the cryptographic asset 217 with the user's digital wallet 225.

At step 333, the process 300 includes performing one or more appropriate actions. In at least one embodiment, the communication service 204 transmits a notification of enrollment to the computing device 203. In one or more embodiments, the communication service 204 receives a request to validate ownership of the cryptographic asset 217 or the user's digital wallet 225. In at least one embodiment, the validation system 201 performs an ownership authentication process, such as the process 400 shown in FIG. 4 and described herein.

Figure 4:
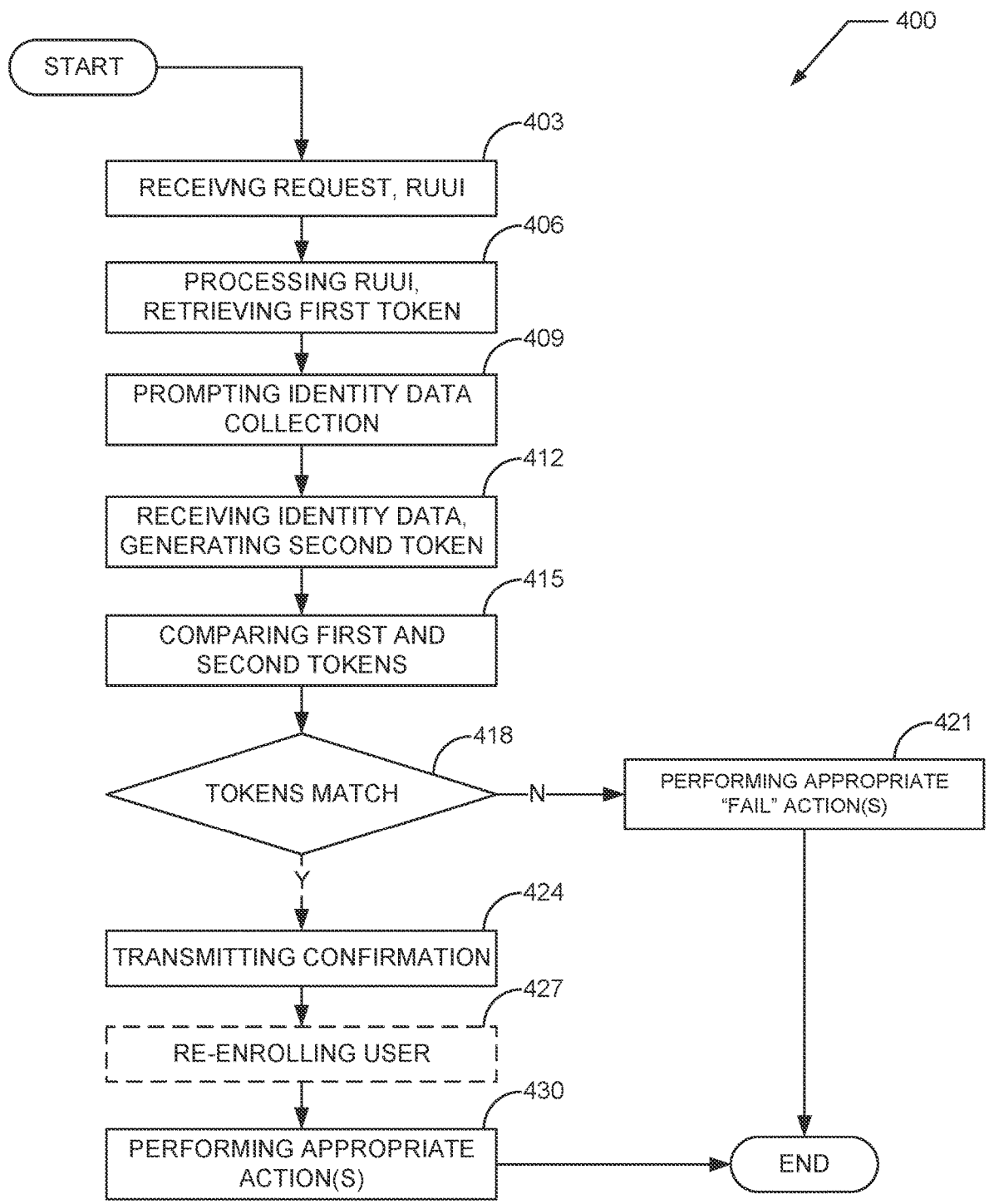
FIG. 4 shows an exemplary ownership validation process, according to one or more embodiments of the present disclosure.

FIG. 4 shows an exemplary ownership authentication process 400 that may be performed by one or more embodiments of the present validation system, such as the validation system 201 shown in FIG. 2 and described herein.

At process 403, the process 400 includes receiving a request to validate ownership of a cryptographic asset 217 and/or a user's digital wallet 225 associated therewith.

At process 406, the process 400 includes processing the RUUI 215 and retrieving a first token 213 associated therewith (e.g., an enrollment token).

At process 409, the process 400 includes prompting a user to collect identity data. In various embodiments, the validation system 201 performs step 409 similar to step 306 of the process 300 shown in FIG. 3 and described herein.

At process 412, the process 400 includes receiving the identity data and generating a second token 213 based on the identity data (e.g., a probe token). In one or more embodiments, the validation system 201 performs step 412 similar to steps 309-321 of the process 300.

At process 415, the process 400 includes comparing the second token 213 to the first token 213. In various embodiments, the matching service 209 compares the second token 213 to the first token 213. In one or more embodiments, the matching service 209 computes one or more similarity scores based on comparing the second token 213 to the first token 213. In at least one embodiment, the similarity score includes a probability score or a distance score. A probability score can refer to a likelihood that a probe token and an enrollment representation are derived from the same identity data (e.g., or same source thereof). In various embodiments, the similarity score includes, but is not limited to, a squared Euclidean distance, $L^2$ norm metric, cosine similarity score, other suitable similarity metrics, or combinations thereof.

At process 418, the process 400 includes determining whether the second 213 matches the first token 213. In one or more embodiments, in response to determining that the second token 213 does not match the first token 213 (e.g., or that the identity data preceding the second token 213 is fraudulent), the process 400 proceeds to step 421. In various embodiments, in response to determining that the second token 213 matches the first token 213, the process 400 proceeds to step 424.

In at least one embodiment, the matching service 209 determines that the second token 213 matches the first token 213 by determining that the second token 213 is within a threshold similarity of the first token 213. In one or more embodiments, the matching service 209 compares one or similarity scores of step 415 to one or more predetermined similarity thresholds. In one example, in response to determining that a similarity score meets a predetermined similarity threshold, the matching service 209 determines that the second token 213 matches the first token 213. In one or more embodiments, in response to determining that the tokens match or are within a threshold similarity, the matching service 209 positively validates the ownership of the crypto-graphic asset 217 associated with the RUUI 215 (e.g., the subject associated with the identity data of step 212 is the same as the user associated with the RUUI 215 and first token 213). In various embodiments, in response to determining that the second token 213 is within a threshold similarity of the first token 213, the matching service 209 positively verifies a subject associated with the second token 213 as being the same subject associated with the first token 213.

At process 421, the process 400 includes performing one or more appropriate fail actions. The validation system 201 can perform step 421 similar to step 318 of the process 300 shown in FIG. 3 and described herein. In at least one embodiment, the communication service 204 transmits a failure signal to the inquirer system 208, the blockchain environment 206, and/or the user's computing device 203. The failure signal can indicate that the validation system 201 was unable to validate ownership of the specified cryptographic asset 217 and/or unable to match the subject's identity data to identity data associated with the user (e.g., the user associated with the first token 213 and RUUI 215). In at least one embodiment, the validation system 201 prevents a requested action from proceeding, such as, for example, a transaction associated with the cryptographic asset 217 (e.g., transfer, staking, redemption, etc.) or the granting of benefits and privileges associated with ownership of the cryptographic asset. In various embodiments, the communication service 204 flags the user account 212 associated with the RUUI 215. For example, the communication service 204 can transmit an alert to a computing device 203 with which the user account 212 is associated. In another example, the communication service 204 can adjust one or more security settings of the user account 212 and/or the digital wallet 225, such as enabling additional security checks (e.g., username and password, key phrase, device unlock pattern, etc.) and/or multi-factor authentication. In various embodiments, the communication service 204 stores the second token 213 and a new RUUI 215 at the first registry 214 (e.g., the token service 207 generating a new RUUI 215 different from the RUUI 215 stored in the metadata 219).

At process 424, the process 400 includes transmitting a confirmation that the ownership of the cryptographic asset 217 is positively validated. In various embodiments, the communication service 204 transmits the confirmation to the inquirer system 208, the blockchain environment 206, and/or the computing device 203 (e.g., associated with the RUUI 215 and corresponding user account 212). In one or more embodiments, the communication service 204 generates a record of the request, the inquirer system 208, and the RUUI 215 specified in the request of the inquirer system 208. In various embodiments, the communication service 204 stores the record in the user account 212 with which the RUUI 215 is associated (or associates the record with the user account 212).

At process 427, the process 400 includes re-enrolling the user based on the second token 213. In various embodiments, the token service 207 replaces the first token 213 with the second token 213 by dissociating the RUUI 215 from the first token 213 and associating the RUUI 215 with the second token 213. In one or more embodiments, the token service 207 updates the first registry 214 to associate the RUUI 215 with the second token 213 (e.g., removing or maintaining the association of the RUUI 215 with the first token 213).

At process 430, the process 400 includes performing one or more appropriate actions. In various embodiments, the communication service 204 and/or the application 223 transmits a requested action to the user's computing device 204. In one or more embodiments, via inputs to the computing device 203, the communication service 204 receives an approval or disapproval of the requested action and permits or denies the requested action based thereon. Non-limiting examples of the requested action include transfer of ownership of the cryptographic asset 217, access to privileges and benefits associated with the cryptographic asset 217, enrollment of the inquirer system 208, or a digital wallet associated therewith, into the validation system 201, and modification of the cryptographic asset 217 or metadata 219 associated therewith.

In at least one embodiment, the inquirer system 208 requests the ability to prove ownership of the cryptographic asset 217. In various embodiments, the validation system 201 performs the process 400 in response to the request. In one or more embodiments, following positive validation of ownership, the communication service 204 transmits the request to the computing device 203 for approval. In at least one embodiment, in response to receiving approval from the computing device 203, the communication service 204 initiates an embodiment of the ownership enrollment process 300 (e.g., shown in FIG. 3 and described herein) to collect identity data from the inquirer system 208, generate and store a second token 213 and a second RUUI 215, and modify the metadata 219 to include the second RUUI 215.

Figure 5:
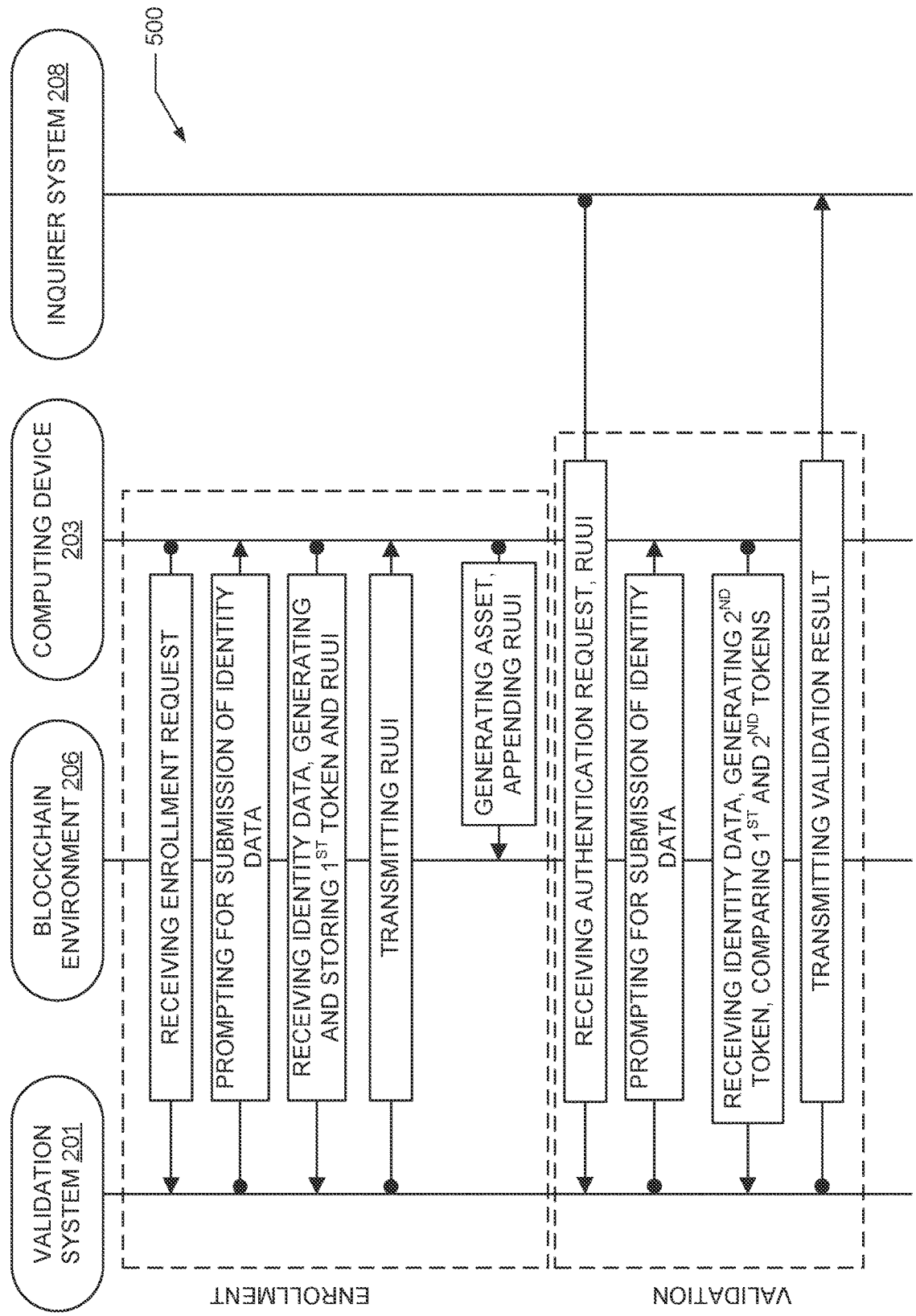
FIG. 5 is a swim-lane diagram of exemplary validation system functions, according to one or more embodiments of the present disclosure.

FIG. 5 shows a swim-lane diagram 500 of exemplary validation system functions and operations.

In various embodiments, to perform ownership enrollment, the validation system 201 receives an enrollment request from the computing device 203. In at least one embodiment, in response to the enrollment request, the validation system 201 prompts the computing device 203 to collect identity data. In one or more embodiments, the validation system 201 receives the identity data from the computing device 203, generates a first privacy-secured token and a random unique user identifier (RUUI) based on the identity data, and stores the first privacy-secured token and the RUUI in a first registry. In various embodiments, the validation system 201 transmits the RUUI to the computing device 203 and/or the blockchain environment 206. In at least one embodiment, the computing device 203 communicates with the blockchain environment 206 to generate or modify a cryptographic asset such that metadata thereof includes the RUUI.

In one or more embodiments, to perform ownership validation, the validation system 201 receives an authentication request and the RUUI from an inquirer system 208. In various embodiments, in response to the authentication request, the validation system 201 requests identity data from the computing device 203 and retrieves the first privacy-secured token from the registry based on the RUUI. In at least one embodiment, the validation system 201 receives the identity data from the computing device 203, generates a second privacy-secured token based on the identity data, and compares the second privacy-secured token to the first privacy-secured token. In one or more embodiments, based on the comparison, the validation system 201 transmits a positive or negative validation result to the inquirer system 208.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method, comprising:
   receiving identity data from a computing device;
   verifying that the identity data is associated with a live subject;
   generating a privacy-secured token based on the identity data;
   generating a randomized unique user identifier (RUUI);
   storing the privacy-secured token and the RUUI in association at a first registry;
   transmitting the RUUI to the computing device; and
   configuring metadata of a cryptographic asset to include the RUUI, wherein:
      the cryptographic asset is associated with a second registry; and
      the second registry is associated with a blockchain environment.

2. The method of claim 1, wherein the RUUI is a first RUUI, the method further comprising:
   receiving an ownership validation request from a second computing device, wherein:
      the ownership validation request comprises a second RUUI; and
      the second computing device derived the second RUUI from the second registry;
   in response to the ownership validation request, prompting the computing device to provide second identity data;
   receiving the second identity data from the computing device;
   generating a second privacy-secured token based on the second identity data;
   retrieving the privacy-secured token from the first registry based on the second RUUI, the second RUUI being the same as the first RUUI; and
   positively validating ownership of the cryptographic asset based on a comparison of the second privacy-secured token to the privacy-secured token.

3. The method of claim 1, wherein the identity data comprises a facial image.

4. The method of claim 3, wherein the identity data further comprises personal identifiable information (PII) data.

5. The method of claim 4, further comprising encoding the PII data into a fixed-size representation prior to generating the privacy-secured token.

6. The method of claim 1, wherein:
   the identity data comprises first biometric data of a first type and second biometric data of a second type; and
   the method further comprises:
      generating a first fixed-size representation (FXR) based on the first biometric data;
      generating a second FXR based on the second biometric data; and
      generating the privacy-secured token based on a blended FXR derived from the first FXR and the second FXR.

7. The method of claim 6, wherein the first type is facial feature and the second type is fingerprint.

8. The method of claim 6, further comprising generating the blended FXR by directly blending the first FXR and the second FXR.

9. The method of claim 6, further comprising generating the blended FXR by sequentially blending the first FXR and the second FXR.

10. A system, comprising:
   a first registry; and
   at least one computing device in communication with the first registry, wherein the at least one computing device is configured to:
      receive identity data from a second computing device;
      verify that the identity data is associated with a live subject;
      generate a privacy-secured token based on the identity data;
      generate a randomized unique user identifier (RUUI);
      store the privacy-secured token and the RUUI in association at the first registry; and
      transmit the RUUI to the second computing device, wherein:
         the second computing device is configured to command a blockchain environment to configure metadata of a cryptographic asset to include the RUUI; and
         the blockchain environment comprises a second registry configured to store the cryptographic asset and the metadata.

11. The system of claim 10, wherein the RUUI is a first RUUI and the at least one computing device is further configured to:
- receive, from a third computing device, an ownership validation request comprising a second RUUI;
- in response to the ownership validation request, prompt the second computing device to provide second identity data;
- receive the second identity data from the second computing device;
- generate a second privacy-secured token based on the second identity data;
- retrieve the privacy-secured token from the first registry based on the second RUUI, the second RUUI being the same as the first RUUI; and
- positively validate ownership of the cryptographic asset based on a comparison of the second privacy-secured token to the privacy-secured token.

12. The system of claim 11, wherein the at least one computing device is configured to transmit a confirmation of ownership validation to the third computing device.

13. The system of claim 10, wherein the identity data comprises device data and biometric data.

14. The system of claim 13, wherein the at least one computing device is configured to, prior to generating the privacy-secured token:
- encode the device data into a first FXR; and
- generate a second FXR based on the biometric data.

15. The system of claim 10, wherein:
- the identity data comprises first biometric data of a first type and second biometric data of a second type; and
- the at least one computing device is further configured to:
  - generate a first FXR based on the first biometric data;
  - generate a second FXR based on the second biometric data; and
  - generate the privacy-secured token based on a blended FXR derived from the first FXR and the second FXR.

16. The system of claim 15, wherein the first type is facial feature and the second type is fingerprint.

17. The system of claim 15, wherein the at least one computing device is configured to generate the blended FXR by directly blending the first FXR and the second FXR.

18. The system of claim 15, wherein the at least one computing device is configured to generate the blended FXR by sequentially blending the first FXR and the second FXR.

19. A non-transitory, computer-readable medium having instructions stored thereon that, when executed by a computer, cause the computer to:
- receive identity data from a second computing device;
- verify that the identity data is associated with a live subject;
- generate a privacy-secured token based on the identity data;
- generate a randomized unique user identifier (RUUI);
- store the privacy-secured token and the RUUI in association at a first registry;
- transmit the RUUI to the second computing device, wherein:
  - the second computing device is configured to command a blockchain environment to configure metadata of a cryptographic asset to include the RUUI; and
  - the blockchain environment comprises a second registry configured to store the cryptographic asset and the metadata.

20. The non-transitory, computer-readable medium of claim 19, wherein the RUUI is a first RUUI and the instructions, when executed by the computer, further cause the computer to:
- receive, from a third computing device, an ownership validation request comprising a second RUUI;
- in response to the ownership validation request, prompt the second computing device to provide second identity data;
- receive the second identity data from the second computing device;
- generate a second privacy-secured token based on the second identity data;
- retrieve the privacy-secured token from the first registry based on the second RUUI, the second RUUI being the same as the first RUUI; and
- positively validate ownership of the cryptographic asset based on a comparison of the second privacy-secured token to the privacy-secured token.

* * * * *